Jan. 16, 1940.　　　W. A. KROPP　　　2,187,608
LUBRICATING APPARATUS
Filed Oct. 4, 1937

Inventor
Willis A. Kropp
By Williams, Bradbury,
McCaleb & Hinkle
Attys.

Patented Jan. 16, 1940

2,187,608

UNITED STATES PATENT OFFICE 2,187,608

LUBRICATING APPARATUS

Willis A. Kropp, Oak Park, Ill., assignor to Stewart-Warner Corporation, Chicago, Ill., a corporation of Virginia Application October 4, 1937, Serial No. 167,141

10 Claims. (Cl. 184—1)

This invention relates to lubricating apparatus, and more particularly to devices for lubricating frictionless bearings.

Heretofore much waste has been experienced with apparatus conventionaly employed to pack frictionless bearings with lubricant. The lubricant has been permitted to come into contact indiscriminately with the various bearing parts being packed with lubricant in such a way as to leave clinging to the exposed surfaces of the various parts large quantities of lubricant that either had to be wiped off as waste or remained to collect contaminating dust and dirt. In addition to this, the devices conventionally employed for packing frictionless bearings with lubricant were so constructed as to be difficult to operate with any degree of rapidity and efficiency, particularly with bearings of different sizes.

Consequently, one of the objects of the present invention is to provide an improved means for packing frictionless bearings with lubricant.

Another object of the invention is to provide an improved means for lubricating frictionless bearings which eliminates waste and loss of lubricant.

Another object of the invention is to provide a means for packing a frictionless bearing with the correct amount of lubricant without any surplus remaining to be removed or wasted.

Another object of the invention is to provide an improved packing means for handling various sized frictionless bearings with rapidity and equal facility.

Another object of the invention is to provide an improved means for packing frictionless bearings with lubricant which is simple in construction and operation, thoroughly effective in its use, and inexpensive to manufacture and maintain.

These being among the objects of the invention, other and further objects will become apparent from the drawing, the description relating thereto, and the appended claims.

Referring to the drawing.

Figure 1:
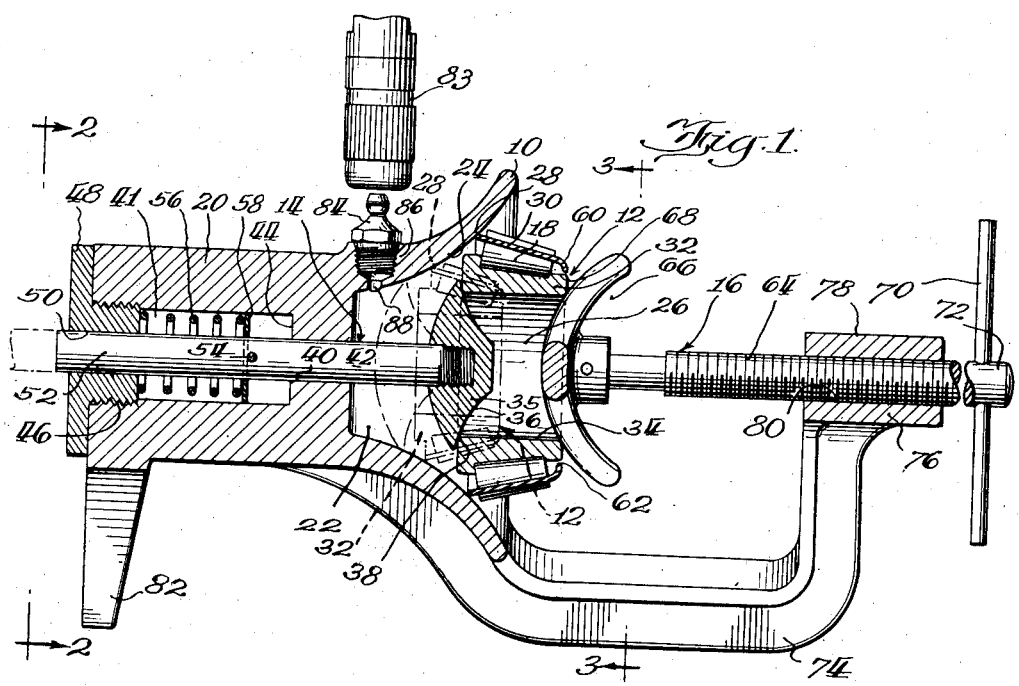
Fig. 1 is a longitudinal cross section of a lubricating apparatus illustrating the preferred embodiment of the invention.
Figure 2:
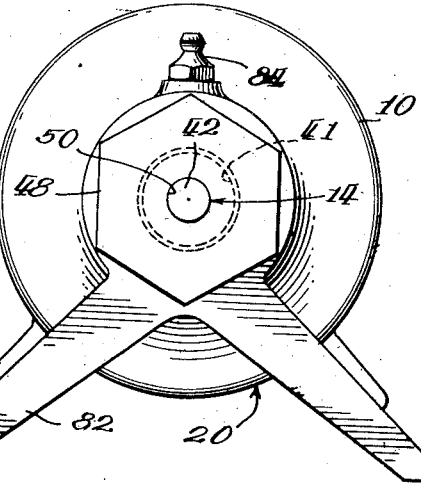
Fig. 2 is an end view of the embodiment taken on the line 2—2 of Fig. 1.
Figure 3:
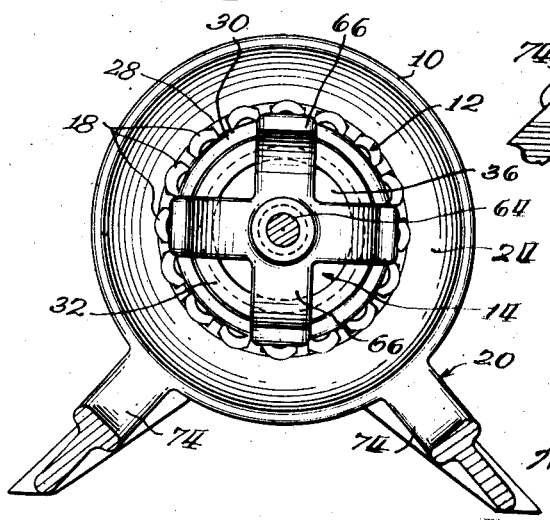
Fig. 3 is a sectional view of the embodiment taken on the line 3—3 of Fig. 1.

The lubricating apparatus embodying the invention and shown in the several views of the drawing comprises in its broad aspect a flared bell-like mouth 10 for engaging the perimeter of a frictionless bearing assembly 12 in lubricant sealed relationship, and a resilient headed plunger 14 at the base or bottom of the flared mouth 10 for engaging the bearing assembly 12 at the inner edge thereof in lubricant sealed relationship.

A clamping mechanism 16 is employed in combination with the flared mouth 10 and the plunger 14 to establish and maintain the sealed relationships just mentioned, and in addition to the clamping mechanism 16 a means is employed to supply the flared mouth 12 with lubricant under pressure whereby lubricant is forced into the spaces between the rolling members 18 of the frictionless bearing 12.

Referring now to the drawing in further detail, the flared bell portion 10 is formed as an integral part of a casting 20 and provides a space at the closed end thereof which may be referred to as the lubricant compartment 22. Beyond this compartment the bell portion provides a face 24 defining a surface of revolution with the axis 26 thereof disposed in a horizontal plane, and the sides thereof convexly curved. This particular contour of the face 24 is so designed as to receive in sealed relationship thereagainst the outer perimeter or circular edge 28 of the roller retaining rings 30 of different sized frictionless bearings with adequate clearance between the face 24 and the race members 32 to permit the free flow of lubricant from the compartment 22 into the spaces between the roller members 18.

For purposes of sealing the bore 24 of the bearing race 32 against escape of lubricant therethrough, a resiliently mounted plunger 14 coaxial with the face 24 of the flared mouth 10 is employed in the lubricant compartment 22, having a head portion 35 with a bearing contacting face 36 defining a surface of revolution the sides of which are concavely curved and taper towards the clamping mechanism 16. The headed plunger 14 is designed with this particular contour so as to accommodate the bores 34 of different sized bearings and to engage the adjacent edge 38 of the bearing 12 in a sealed relationship to prevent lubricant from entering the bore 34 of each bearing 12 at any time. In addition to this, the curvilinear contour of the contacting face 36 enables the plunger to function rapidly and with equal facility in conjunction with bearings of different sizes.

The casting 20 is provided with a bore 40 adjacent the compartment 22, coaxial with the flared mouth 10 and of a size to receive snugly therein the stem 42 of the headed plunger 14 for reciprocable movement thereof under approximately lubricant sealed conditions. Remote from the lubricant compartment 22 the bore 40 is enlarged as at 41 to provide a shoulder indicated at 44 and terminates in a threaded portion 46 which receives a guide bushing 48 therein which also has a central bore 50 for receiving and supporting the free end 52 of the stem 42. The stem 42 is provided with a cross pin 54 where it abuts against the shoulder 44 to determine the outward limit of movement of the headed plunger 14. A washer 58 is disposed behind the crosspin 54 and a compression coil spring 56 is placed in the bore 41 between the bushing 48 and the washer 58 to act as a resilient drive for the headed plunger 14 to hold the headed plunger outwardly as already described.

The frictionless bearings 12 illustrated are of a conventional type, but of different sizes as differentiated, in Fig. 1, by full and broken lines with which they are shown in their relative positions against the face 24 of the flared mouth 10, including the positions of the headed plunger 14 for the different sizes.

Referring to the full line representation, by way of example, it will be observed that the bearing assembly comprises an inner race member indicated by the numeral 32, having a central bore 34 therethrough, the taper rollers by the numeral 18 and the roller retaining ring by the numeral 30. At one edge 60 the retaining ring is curved radially towards the race member 32 to provide a close clearance therebetween indicated at 62. The opposite edge or perimeter of the retaining ring 30 is circular and engages the face 24 of the flared mouth 10 in lubricant sealed relationship under the clamping pressure brought to bear thereupon by the clamping mechanism 16.

The clamping mechanism already referred to as establishing and maintaining the bearing assembly 12 in sealed and lubricant receiving relationship with the flared mouth 10, more particularly comprises a threaded shaft 64 carrying at one end 65 a spherically faced X-shaped head member 66 for engaging the outer face 68 of the bearing assembly 12 as manually driven by a handle in the form of a cross-pin 70 disposed diametrically through the other end 72 of the shaft. Shaft 64 is supported in operation by two C-shaped extensions 74 projecting from the bell portion 10 of the casting 20 which curve upwardly at their ends and join as at 76 to provide a body portion 78 having a threaded bore 80 therein receiving the threaded shaft 64 coaxial with the flared mouth 10 and the resiliently mounted headed plunger 14. Incidentally, the casting 20 is also supported by diverging legs 82 at the other end thereof.

Although the embodiment illustrated relies upon a threaded relation to accomplish the movement of the spherically headed clamping member 66, it will be appreciated that a quick retractor of the cam and lever type, or of kindred construction, may be employed for the gross movement of the head 66 and the threaded relationship be relied upon merely to accomplish the critical movements involved in tightening and untightening the bearing assembly 12 against the flared mouth 10 and the resilient plunger 14. In the construction shown the length of the extensions 74 and the shaft 64 is sufficient to afford proper clearance for the insertion and removal of bearings of all common sizes between the spherically headed member 66 and the flared mouth 10, it being observed that the contours of these two elements are such that bearing assemblies 12 may be moved therebetween with minimum adjustment of the clamping mechanism 16.

Having thus described the working elements of the preferred embodiment of the invention, it remains only to point out that lubricant is supplied to the lubricant compartment 22 under pressure by means of a coupler 83 connected to a source of lubricant under pressure (not shown) and detachably engaging a fitting 84 which is threadtd in the casting 20 as at 86, and which communicates with a passageway 88 opening into the lubricant compartment 22 behind the head 35 of the plunger 14.

In operation, the shaft 64 is retracted manually, as by turning, to provide adequate clearance between the spherically headed member 66 and the face 24 of the flared mouth 10 for the admission of the bearing assembly 12 therebetween. The bearing assembly is inserted and held with the side having the small clearance 62 adjacent the spherical head 66, and the clamping mechanism 16 is then advanced until the tapered face 36 of the resiliently mounted plunger 14 enters the bore 34. Thereafter the clamping mechanism 16 is further advanced with the face 36 contacting the bearing assembly 12 in a sealed and yielding way until such time as the retainer ring 30 is brought into a proper sealed relationship with the flared face 24. When this seal is established the coupler 83 is connected with the fitting 84 and lubricant forced into the compartment under pressure. This pressure will further tend to maintain the seal between the headed plunger 14 and the race member 32 and will move lubricant along the face 24 of the flared mouth 10, through the space between the retaining ring 30 and the race member 32, and into the space between the rollers 18 until such time as lubricant shall appear to ooze from between the retaining ring 30 and the race member 32 at the clearance 62. Thereafter pressure upon the lubricant in the compartment 22 will be terminated and release of the clamping mechanism 16 commenced.

At this point a very interesting operation is accomplished by the invention. It will be observed that the shape and size of the headed portion 35 of the plunger 14 is such that with its reciprocation a large amount of lubricant is displaced.

This large displacement takes place when the headed plunger moves outwardly as the clamping assembly is released. In order to accommodate this displacement the grease between the bearing assembly 12 and the flared mouth 10 is drawn inwardly behind the headed portion 35 of the plunger 14 and quantities of air to replace this grease is drawn past the inner face of the bearing race 32 in such a way as to clean the surplus lubricant therefrom between the time the seal between the retaining ring 32 and the flared mouth 10 is broken and the time the space therebetween is fully widened by a complete releasing of the clamping mechanism 16. Thereafter, i. e., when the clamping mechanism 16 reaches its fully retracted position, the bearing assembly 12 can be removed without appreciable excess of lubricant clinging thereto.

It will be observed that an improved means is thus provided for packing frictionless bearings with lubricant which prevents lubricant from entering or clinging to bearing parts where it will be useless or wasted, yet places a correct amount where it will serve its purpose. In addition to this, the apparatus handles various sized bearings with equal facility and rapidity and is simple in construction and operation and inexpensive to manufacture and maintain.

Consequently, although a preferred embodiment of the invention has been shown and described herein, it will be apparent to those skilled in the art that various and further uses, modifications and changes may be made without departing from the spirit and substance of the invention, the scope of which is commensurate with the appended claims:

What is claimed is:

1. A lubricant packing tool comprising a lubricant compartment adapted to be placed under pressure and having a mouth defining a surface of revolution adapted to receive the perimeters of bearings of different sizes in lubricant sealed relationship, sealing means resiliently mounted in said compartment for engaging the inner face of a bearing member inserted into said mouth, and means reciprocably mounted relative to said sealing means and said flared mouth for positioning and holding said bearing in grease receiving relationship.

2. A lubricant packing tool comprising a lubricant compartment adapted to be placed under pressure and having a flared mouth defining a surface of revolution, sealing means resiliently mounted in said compartment for engaging the inner face of a bearing member inserted into said mouth, and means reciprocably mounted relative to said sealing means and said flared mouth for positioning and holding said bearing thereagainst in grease receiving relationship.

3. A lubricant packing tool comprising a lubricant compartment adapted to be placed under pressure and having a flared mouth defining a surface of revolution, sealing means resiliently engaging the inner face of a bearing member when inserted in said mouth, and means for positioning and holding said bearing in grease receiving relationship against said flared mouth.

4. A lubricant packing tool comprising a lubricant compartment having a flared opening, a resiliently mounted sealing element reciprocable in said opening, means for placing said compartment under lubricant packing pressure and reciprocable means for holding the bearing in said opening under pressure and in lubricant receiving relationship.

5. A lubricant packing device comprising a lubricant compartment detachably connected with a source of lubricant under pressure and having a flared mouth defining a surface of revolution adapted to receive a bearing therein, sealing means resiliently engaging the inner end of said bearing to close the bore thereof, means for holding said bearing in grease receiving relationship relative to said mouth, and means for supplying said compartment with lubricant under pressure.

6. A lubricant packing device comprising a lubricant compartment detachably connected with a source of lubricant under pressure and having a flared opening defining a surface of revolution adapted to engage the outer perimeter of a frictionless bearing in lubricant sealed relationship, sealing means resiliently engaging the inner adjacent perimeter of said bearing, means for moving and holding said bearing in said opening in lubricant receiving relationshp and means for supplying said compartment with lubricant under pressure.

7. A lubricant packing device comprising a lubricant compartment having a flared opening defining a surface of revolution adapted to receive a bearing therein in lubricant sealed relationship, sealing means resiliently engaging the side of said bearng adjacent said opening to close the bore of said bearing, means for holding said bearing in grease receiving relationship relative to said opening, and means for supplying said compartment with lubricant under pressure.

8. A lubricating apparatus for frictionless bearings comprising a source of lubricant under pressure, a compartment having a flared opening, means for detachably connecting said compartment with said source of lubricant, means for detachably holding a bearing to be lubricated in sealed contact with said flared opening, and means resiliently engaging said bearing in sealed relationship for preventing the entrance of lubricant into the bore of said bering.

9. A lubricating apparatus for frictionless bearings comprising a source of lubricant under pressure, a compartment having a flared opening for receiving the perimeters of bearings of different sizes in lubricant sealed relationship, means for detachably connecting said compartment with said source of lubricant, means for detachably holding a bearing to be lubricated in sealing contact with said flared opening and means resiliently engaging said bearing in sealed relation for preventing the entrance of lubricant into the bore of said bearing.

10. A lubricant packing device for a bearing comprising a lubricant compartment having a flared opening defining a surface of revolution, means for holding said bearing in said opening under pressure contact with said surface of revolution and in lubricant receiving relationship, a reciprocable element resiliently mounted in said opening and contacting the bearing in lubricant sealed relationship, and means for placing said compartment under lubricant packing pressure whereby said bearing is supplied with lubricant and the pressure upon the lubricant in said compartment augments the sealing contact of said element with said bearing.

WILLIS A. KROPP.